United States Patent Office 3,560,553
Patented Feb. 2, 1971

3,560,553
MANUFACTURE OF AROMATIC
ACID FLUORIDES
William W Prichard, Hockessin, Del., assignor to E. I.
du Pont de Nemours and Company, Wilmington, Del.
No Drawing. Filed May 9, 1968, Ser. No. 728,069
Int. Cl. C07c 63/24, 63/42, 69/78
U.S. Cl. 260—469                                   8 Claims

ABSTRACT OF THE DISCLOSURE

Aromatic carboxylic acid fluorides can be made by reacting aromatic sulfonyl halides with carbon monoxide and an alkali metal fluoride in the presence of a catalyst of Ru, Rh or Pd. The reagents should be free of hydrogen and substituents or substances which can be dehydrogenated under the conditions of the reaction to yield hydrogen. The aromatic acid fluorides are useful as analytical reagents and for the production of polyamide or polyester polymers.

FIELD OF THE INVENTION

This invention relates to a novel method of making aromatic acid fluorides, including aromatic acid fluorides containing more than one functional group.

Aromatic acyl fluorides, i.e., aroyl fluorides, are valuable chemicals. In some instances, they are capable of reactions which the corresponding aroyl chlorides are incapable. Thus, they can react with aromatic nuclei to give ketones in the absence of added Friedel-Crafts catalysts, whereas aroyl chlorides require the presence of such catalysts. Bifunctional aromatic acyl fluorides and derivatives thereof such as the esters are intermediates in the preparation of valuable condensation polymers by reaction with, for example, diamines or dihydric alcohols. Moreover, aroyl fluorides are in general more stable and resistant to hydrolysis than aroyl chlorides.

It is known (Prichard U.S. Pat. 2,696,503) that aroyl fluorides can be prepared by carbonylation of aryl halides in the presence of an alkali metal fluoride and nickel carbonyl or a precursor thereof such as metallic nickel or a nickel halide. This process is not free from disadvantages, however. Not only are the conversions rather low, but the reaction promoter or catalyst, i.e., nickel carbonyl or a precursor, must be used in much larger than catalytic amounts, because of side reactions which destroy it in part. In practice, the nickel carbonyl is used in stoichiometric or higher amounts relative to the aryl halide. Another disadvantage is the toxicity and fire hazard of nickel carbonyl.

In a copending application, S.N. 648,988 filed June 26, 1967, it has been disclosed that acyl fluorides can be prepared by the reaction of aromatic halides with carbon monoxide in the presence of hydrogen fluoride or alkali metal fluorides and a catalyst containing ruthenium, rhodium or palladium.

It has now been discovered that, under more limited conditions, aromatic sulfonyl halides can be converted to acid fluorides directly by a catalytic process. The new reaction proceeds cleanly in high yield, and when applicable is greatly preferred as a route to aroyl fluorides.

DEFINITION OF THE INVENTION

This invention is a process for making aromatic acid fluorides which comprises reacting an aromatic compound selected from benzene, naphthalene, biphenyl, phenyl ether, phenyl sulfone, and anthracene, and containing at least one aromatic sulfonyl halide group with carbon monoxide and if the halide is other than fluoride, an alkali metal fluoride at a pressure of at least 100 atmospheres, preferably 600 to 900 atmospheres, at a temperature of at least 200, preferably 250 to 375° C., in the presence of a catalyst comprising Pd, Rh or Ru as metal or as metal halide and optionally in the presence of an inorganic Lewis acid. The reaction mixture should be free of hydrogen, or hydrogen-forming substances.

DETAILED DESCRIPTION OF THE INVENTION

The reaction of the present invention is a catalytic reaction employing heterogeneous catalysts in catalytic amounts. Accordingly, batch process or continuous processes can be employed to conduct the reaction.

The catalyst system which is the distinguishing feature of this invention comprises, as the primary active ingredient, one of the metals ruthenium, rhodium or palladium. These metals can be used in the free, uncombined state, either unsupported or, preferably, on one of the conventional catalyst supports such as activated carbon, charcoal, carborundum, silica gel, alumina, acidic silica-alumina, and the like; or as the metal halide, preferably chloride or bromide, as such or on a support. The metal catalyst can be used along, as illustrated in some of the examples that follow. However, better conversions to the aroyl fluoride are generally obtained when the catalyst system also contains an inorganic Lewis acid. Lewis acids, as first defined by G. N. Lewis in his classic paper in J. Franklin Institute 226, 293 (1938), are well known to chemistry. By definition, a Lewis acid is a molecule, the structure of which, electronically speaking is such that it is capable of accepting one or more electrons from a molecule which is capable of donating such electrons, i.e., has an electron-rich structure. Many and varied Lewis acids are known. Examples of wholly inorganic Lewis acids, which are those coming under consideration here, are the halides, preferably fluorides, of certain elements which include aluminum chloride, aluminum bromide, tin tetrachloride, zinc chloride, zinc bromide, boron trichloride, boron trifluoride, vanadium trifluoride, titanium tetrachloride, antimony pentachloride, antimony pentafluoride, ferric chloride, the mineral silicates and silicas, etc. The catalyst(s) need be used only in catalytic amounts. Thus, in a batch system there is generally used, per mole of aromatic sulfonyl halide in the reaction system, between 0.0005 and 0.01 g. atom of free ruthenium, rhodium or palladium metal or mole of metal halide, and between 0.001 and 0.02 mole of Lewis acid. Of course, much larger quantities of the catalysts can be used, but this is generally unnecessary.

The aromatic compounds which are used as starting materials include derivatives of benzene, naphthalene, anthracene, biphenyl, phenyl ether and phenyl sulfone. Preferably no substituents other than the sulfonyl halide groups to be converted to the carboxylic acid fluoride groups should be present, except carboxylic acid fluoride groups which do not affect the reaction. However, halogen substituents (which are converted at least in part to carbonyl fluoride groups by the process described and claimed in U.S. application 648,988) can also be present.

Of the sulfonyl halides, sulfonyl fluoride substituted aromatic compounds are the preferred starting material. When sulfonyl fluorides are the starting materials, no alkali metal fluoride is necessary. Sulfonyl chloride compounds can also be used. Sulfonyl bromides or iodide compounds are operable in the process, but are not preferred for reasons of cost and difficulty of obtaining these compounds.

It is preferred that the reaction be performed in the absence of any diluent, but diluents such as benzene, biphenyl, or phenyl ether, including mixtures such as those sold under the trade name, Dowtherm, are acceptable. Aliphatic hydrocarbons, or aromatic hydrocarbons containing alkyl substituents interfere with the reaction and should not be employed.

Any alkali metal fluoride can be employed in the practice of this invention, but sodium fluoride is strongly preferred for reasons of cost. The amount of alkali fluoride in the reaction mixture is not critical, since some reaction will take place regardless of the amount, but for optimum yield, it is preferred to use at least 0.8 mole of alkali metal fluoride per equivalent of the sulfonyl halide reactant and preferably from 1 to 2.5 moles of alkali metal fluoride per equivalent.

The reaction is conducted at a temperature of at least 200° C. The upper limit of temperature is only the decomposition point of the reactants and reaction products. In practice, it is not necessary to exceed about 400° C., although somewhat higher temperatures can be used in a continuous flow, low contact time system. The preferred temperature range is that between 250 and 375° C.

The reactants, solvents if any, and equipment used should be substantially anhydrous since the presence of water or moisture decreases the yields hthrough hydrolysis of the reaction product.

The system, including reactants should also be substantially free of hydrogen or ingredients capable of yielding hydrogen under the reaction conditions such as aliphatic or cycloaliphatic solvents, alkyl substituted aromatic compounds, acids, alcohols and the like. Likewise the carbon monoxide should be substantially free of hydrogen, and preferably should contain less than 100 p.p.m. of hydrogen.

The following examples illustrate the invention but should not be construed as fully dilineating the scope thereof.

EXAMPLE 1

A pressure vessel, lined with "Hastelloy C" was charged with 35.3 g. (0.2 mole) of benzenesulfonyl chloride, 75 g. of benzene, 1.5 g. of a 10% Pd-on-C catalyst, 0.5 g. $AlCl_3$ and 10 g. NaF. The tube was sealed, pressured to 200 atm. with CO and heated with agitation to 325° C. Carbon monoxide pressure was raised to 900 atm. and the mixture shaken for 4 hrs. at 860–900 atm., with repressuring as necessary. The vessel was cooled, vented, and the contents discharged. A total recovery of 115.8 g. was obtained. This was separated into 92.1 g. of volatile material and 14.5 g. of material not volatile at 250° C. and 0.1 mm. pressure using a stripping still. Analysis of the volatile components by gas chromatography on a column packed with G.E. "XE–60 Silicone Gum Nitrile" on "Gas Chrom R" indicated 0.1055 mole or 53% of benzoyl fluoride to be present in the reaction mixture.

EXAMPLE 2

A charge of 12.5 g. 4,4'-biphenyldisulphonyl chloride, 15 g. of NaF and 1 g. of a 10% Pd-on-C catalyst was processed as in Example 1 at a maximum temperature and pressure of 350° C. and 900 atm. CO for 3 hrs. The material recovered weighed 25.35 g. This was separated by extraction with hot chloroform into 5.7 g. of soluble and 19.6 g. of insoluble material. The soluble material was sublimed to yield 3.59 g. of sublimate which was identified as almost pure 4,4'-biphenyldicarbonyl fluoride (40% of theory). The neutral equivalent was 59.4 (calculated 61.5). The NMR spectrum in $DCCl_3$ gave a clean $A_2B_2$ pattern with no evidence of isomeric impurities. Gas chromatographic analysis on a column packed with methyl vinyl silicone gum rubber on "Diatopont S" and programmed from 100° C. by 10° C. increments showed a single component with a retention time of 15.3 minutes to be present. The compound, after recrystallization from chloroform, melted at 166–167° C.

Following the above procedure bis(4-chlorosulfonylphenyl) ether can be converted to bis(4-fluorocarbonylphenyl) ether; bis(3-chlorosulfonylphenyl) sulfone can be converted to bis(3-fluorocarbonylphenyl) sulfone; and 1,5- and 2,6-naphthalenedisulfonyl chloride can be converted to 1,5- and 2,6-naphthalenedicarbonyl fluoride, respectively.

EXAMPLE 3

To a 350 ml. stainless-steel-lined pressure tube was added 48 g. (0.3 mole) benzenesulfonyl fluoride, 12.6 g. (0.3 mole) sodium fluoride and 5 g. 10% palladium on charcoal. The tube was heated to 275±5° C., while being pressurized with carbon monoxide to 600 atm. and held at these conditions for 4 hours. The tube was cooled, discharged and rinsed with benzene. The product mixture was filtered and the solids on the filter rinsed with benzene. The benzene filtrate was concentrated on a rotary evaporator to give 30 g. residue. An infrared spectrum of the residue contained an absorption band at 1805 cm.$^{-1}$. The residue was subjected to gas chromatography (82° C., 2 ft. Hi-Eff 8BP, He flow 120 ml./min.). The chromatogram indicated the presence of three compounds. Each was collected as it eluted from the column. The infrared spectrum of each compound was recorded and compared with that of an authentic sample. The three compounds were identified as (in order of elution), benzene (from rise) benzoyl fluoride, and benzenesulfonyl fluoride. On the basis of the areas underneath the "peaks" of the gas chromatogram, conversion of benzenesulfonyl fluoride to benzoyl fluoride was estimated to be 20%.

EXAMPLE 4

To a 350 ml. stainless-steel-lined pressure tube was added 32 g. (0.2 mole) benzenesulfonyl fluoride, 0.84 g. (0.02 mole) sodium fluoride and 5 g. of the palladium-on-charcoal catalyst recovered from the process of Example 3. The tube was heated to 300±5° C. while being pressurized with carbon monoxide to 600 atm. and held at these conditions for 4 hours. The tube was cooled, discharged and rinsed with benzene. The product mixture was filtered and the solids on the filter rinsed with benzene. The benzene filtrate was evaporated to give 24.8 g. residue. An infrared spectrum of the residue was recorded and showed a weak absorption band at 1805 cm.$^{-1}$ On the basis of the areas underneath the "peaks" of a gas chromatogram, conversion of benzenesulfonyl fluoride to benzoyl fluoride was estimated to be 10%.

EXAMPLE 5

To a 350 ml. stainless-steel-lined pressure tube was added 13.0 g. (0.041 mole) 4,4'-biphenyldisulfonyl fluoride, 5.2 g. (0.124 mole) sodium fluoride and 5.0 g. 10% palladium on charcoal. The tube was heated to 325±5° C. while being pressurized with carbon monoxide to 600 atm. The tube was cooled, discharged and rinsed with benzene. The benzene rinse was saved separately from the solid product (19.2 g.). A portion (1.0 g.) of the solid product was extracted with a small amount of chloroform and an infrared spectrum of the extract recorded. The spectrum contained absorption bands at 3005 (w.), 1805 (s.), 1600 (m.), 1395 (w.), 1250 (m.), 1060 (m.), 1000 (m.) and 840 cm.$^{-1}$ (w.). Evaporation of the solvent gave a yellow solid, M.P. 155–165° C.

To the remaining 18.2 g. of solid was added 200 ml. chlorobenzene and 200 ml. methanol. The mixture was boiled for 20 min., filtered, cooled and 40 ml. pyridine added. After 10 min., white crystals appeared and were collected and washed with hexane. Ninety-five per cent of these crystals melted at 210–218° C. The infrared spectrum of these crystals was identical with that of an authentic sample of dimethyl 4,4'-bibenzoate. The NMR spectrum showed a 4-line pattern characteristic of 4,4'-disubstitution. An additional 2.6 g. of crude dimethyl 4,4'-bibenzoate was recovered by exaporation of the filtrate.

The catalyst residue (14.4 g.) was slurried with 400 ml. water and filtered. The aqueous filtrate was concentrated twice to give 5.9 g. white crystals (M.P.>300° C.). These crystals were identified as the disodium salt of 4,4'-biphenyldisulfonic acid by comparison of the infrared spectrum with that of an authentic sample. The yield of crude dimethyl 4,4'-bibenzoate, assuming recovery of 4-4'-biphenyldisulfonic acid, disodium salt, is 84% of theory.

EXAMPLE 6

To a 350 ml. stainless-steel-lined pressure tube was added 16.0 g. (0.1 mole) benzenesulfonyl fluoride, 0.42 g. (0.01 mole NaF and 5.0 g. 10% palladium on charcoal. The tube was heated to 300±5° C. while being pressured with carbon monoxide to 600 atm. and held at these conditions for 3½ hrs. The tube was cooled, discharged and rinsed with benzene. The product mixture was filtered and the filtrate analyzed by infrared spectroscopy and gas chromatography. The infrared spectrum of the product was similar to that of authentic benzoyl fluoride except for absorption bands at 1690, 1405 and 1202 cm.$^{-1}$. After an aqueous sodium bicarbonate wash, the band at 1690 cm.$^{-1}$ disappeared. The bands at 1202 and 1405 cm.$^{-1}$ are characteristic bands in the spectrum of benzenesulfonyl fluoride. On the basis of the areas underneath the "peaks" of the gas chromatogram, conversion of benzenesulfonyl fluoride to benzoyl fluoride was estimated to be 80%.

EXAMPLE 7

A charge of 15 g. benzenesulfonyl fluoride, 75 g. for 4 hours at 350° and 700 atm. CO pressure in the vessel described in Example 1. The recovered material weighed 84.5 g. The volatile constituents of the product, 80.2 g., were separated using a stripping still and analyzed by gas chromatography. In addition to the benzene solvent, the product consisted of 8.22 g. (45.3%) of recovered benzenesulfonyl fluoride and 2.32 g. (44.2% yield) of benzoyl fluoride. No volatile by-products were found. The non-volatile residue weighed 1.6 g.

EXAMPLE 8

A charge of 52.8 g. benzenesulfonyl chloride, 21 g. sodium fluoride and 2 g. of a 5% Rh-on-C catalyst was processed exactly as in Example 7. The product was separated by distillation into 17.48 g. of volatiles and 26.32 g. non-volatile residue. Gas-chromatographic analysis of the volatile portion of the product showed it to contain 1.8 g. of benzene, 5.4 g. chlorobenzene, 5.5 g. (14.8%) benzoyl fluoride, 1.4 g. benzenesulfonyl fluoride and 3.3 g. benzoic acid. A trace of benzenesulfonyl chloride was recovered unchanged.

EXAMPLE 9

The conditions of Example 8 were repeated, the catalyst being replaced by 2 g. of 5% Ru-on-C. The volatile portion of the product, 22.8 g., was distilled, leaving 26.1 g. residue. Analysis of the volatile fraction showed it to consist of benzene, 1.1 g.; chlorobenzene, 7.62 g.; benzoyl fluoride, 2.17 g. (6.5%); benzenesulfonyl fluoride, 4.43 g.; and benzoic acid, 6.1 g. Very little benzenesulfonyl chloride was recovered unchanged.

The manufacture of acid fluorides by the process of the present invention can be used as a step in an economical process for the manufacture of esters of aromatic acids such as the dimethyl ester of bibenzoic acid, which will be employed to illustrate this process.

(i) Biphenyl can be reacted with fluorosulfonic acid to give 4,4'-biphenyldisulfonyl fluoride by the method of Renoll, J. Am. Chem. Soc. 64 1489 (1942). The reaction, which is exothermic can be conducted between about −10° C. and 110° C., preferably from about 30° C. to 70° C. No solvent is needed.

(ii) 4,4'-biphenyldisulfonyl fluoride is converted to 4,4'-biphenyldicarbonyl fluoride by the process described hereinabove. Sulfur dioxide is formed by a by-product of this reaction.

(iii) 4,4'biphenyldicarbonyl fluoride is esterified by heating it with methanol to a temperature in the range of about 100 to 200° C. to form dimethyl 4,4'-bibenzoate, hydrogen fluoride being formed as a by-product.

(iv) The sulfur dioxide formed in step (ii) can be oxidized with air using contact catalysts according to the well-known contact process for the manufacture of sulful trioxide. The sulfur trioxide is then reacted with the hydrogen fluoride of step (iii) to form fluorosulfonic acid suitable for use in step (i).

The dimethyl 4,4'-bibenzoate which can be made by the aforesaid process is a valuable intermediate for the manufacture of polymers.

The novel process described, however, can be employed to make a wide variety of aromatic esters which have a variety of uses including but not limited to high boiling solvents and heating media.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. Method of making aromatic carbonyl fluoride compounds which comprises reacting an aromatic reactant consisting of benzene, naphthalene, anthracene, biphenyl, phenyl ether, or phenyl sulfone substituted with at least one sulfonyl halide group, with carbon monoxide and if the halide of the sulfonyl halide is other than fluoride, an alkali metal fluoride, in the presence of a catalyst comprising ruthenium, rhodium or palladium metals, or halides thereof, at a pressure of at least 100 atmospheres and at a temperature of at least 200° C. under substantially anhydrous conditions, and in the absence of hydrogen or hydrogen-forming compounds.

2. Method of claim 1 where said catalyst additionally comprises an inorganic Lewis acid.

3. Method of claim 1 in which said catalyst comprises ruthenium, rhodium or palladium metals.

4. Method of claim 1 in which said sulfonyl halide group is a sulfonyl fluoride group.

5. Method of claim 4 in which the temperature at which the reaction is accomplished is 250–375° C.

6. Method of claim 5 in which the pressure at which the reaction is accomplished is 600–900 atmospheres.

7. Method of claim 5 in which the aromatic reactant is 4,4'-biphenyldisulfonyl fluoride.

8. Method of making dimethyl 4,4'-bibenzoate which comprises:
  (i) reacting biphenyl with fluorosulfonic acid to obtain 4,4'-biphenyldisulfonyl fluoride;
  (ii) reacting the 4,4'-biphenyldisulfonyl fluoride obtained in step (i) with carbon monoxide in the presence of a catalyst comprising ruthenium, rhodium or palladium metals as halides thereof at a pressure of at least 100 atmospheres and at a temperature of at least 200° C. to obtain 4,4'-biphenyldicarbonyl fluoride and sulfur dioxide;
  (iii) reacting the 4,4'-biphenyldicarbonyl fluoride obtained in step (ii) with methanol to obtain dimethyl 4,4'-bibenzoate and hydrogen fluoride;
  (iv) oxidizing the sulfur dioxide obtained in step (ii) to sulfur trioxide and reacting the sulfur trioxide with hydrogen fluoride to obtain fluorosulfonic acid and recycling said fluorosulfonic acid to step (i).

No references cited.

LORRAINE A. WEINBERGER, Primary Examiner

J. L. DAVISON, Assistant Examiner

U.S. Cl. X.R.

260—544